June 4, 1968  H. DICKINSON ET AL  3,386,468
BREATHER VALVE CONSTRUCTION
Filed Dec. 27, 1965
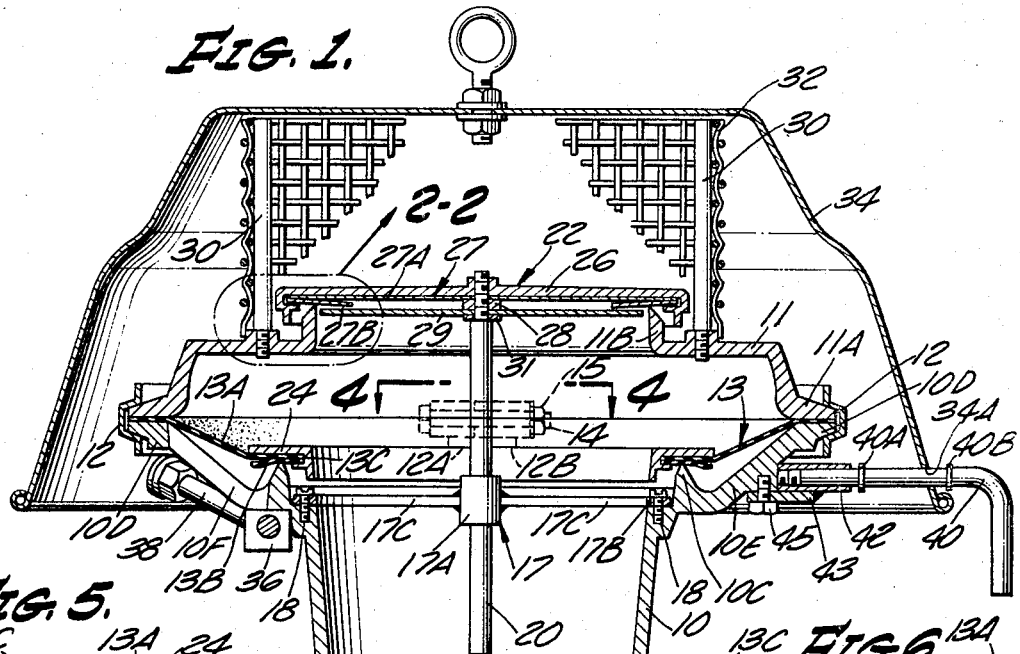
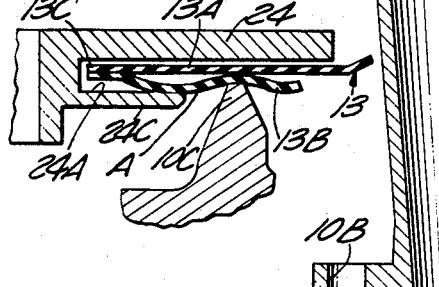
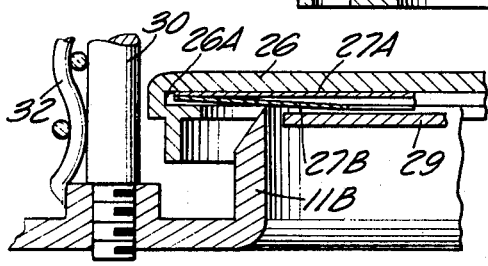
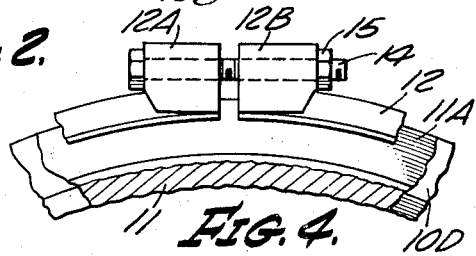
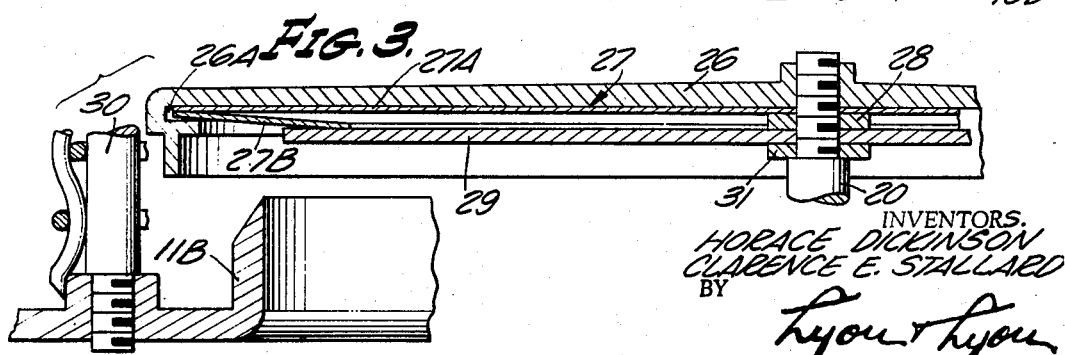
INVENTORS.
HORACE DICKINSON
CLARENCE E. STALLARD
BY
Lyon & Lyon
ATTORNEYS

United States Patent Office 3,386,468
Patented June 4, 1968

3,386,468
BREATHER VALVE CONSTRUCTION
Horace Dickinson, Southgate, and Clarence E. Stallard, Lakewood, Calif., assignors to Varec, Inc., a corporation of California
Filed Dec. 27, 1965, Ser. No. 516,381
4 Claims. (Cl. 137—496)

ABSTRACT OF THE DISCLOSURE

A pressure relief valve structure involves a special annular diaphragm having its outer peripheral portion secured to a housing and its inner peripheral portion of special two-part construction slidably mounted in an annular grooved portion of a ring-shaped pallet member. One of such diaphragm parts contacts a valve seat and forms an expansible pocket with the other diaphragm part. Such pocket increases in size with increase in differential pressure on opposite sides of the diaphragm until the pallet member ultimately pops from its seated condition to automatically relieve pressure.

---

The present invention relates to improved means and techniques useful in the control or regulation of various pressure media and is particularly useful in the construction of so-called pressure or breather controls that are installed on storage tanks for purposes of assuring certain pressure conditions in such storage tank.

In general, the arrangement described herein is a structure which is mountable on a storage tank and incorporates two valves, one of the valves, referred to as a pressure valve, serving to automatically vent the tank to the atmosphere upon the obtainance of a predetermined pressure in the tank and the other valve serving to automatically open when a predetermined vacuum condition exists in the tank. Thus, as long as the tank pressure is within a certain pressure range extending both above and below atmospheric pressure, the valves remain in their normally closed positions. For this purpose, each of such valves includes a pallet assembly which is normally in contact with a cooperating valve seat.

An important feature of the present invention resides in a tight sealing control throughout the prescribed pressure and vacuum range, and this involves a unique pallet assembly with a novel diaphragm carried thereby. It is therefore a general object of the present invention to provide an improved control of this character that provides tight sealing throughout a predetermined pressure and vacuum range.

Another object of the present invention is to provide a new pallet assembly that involves a so-called balloon type diaphragm of the general character as described and claimed in the copending patent application Serial No. 156,002 filed November 30, 1961 of Horace Dickinson, Robert P. Hanke and Wilbur G. Hein, now U.S. Patent 3,235,225, and assigned to the same assignee as the present application.

A specific object of the present invention is to provide an arrangement of this character in which there is a novel vacuum valve construction.

Another specific object of the present invention is to provide a new balloon type diaphragm incorporated in a vacuum pallet assembly.

Another specific object of the present invention is to provide an improved vacuum valve construction featured by the fact that the inner peripheral portion of a diaphragm is free to move in an annular groove portion of the vacuum pallet member and near the valve seat so as to use differential pressures developed for establishing a seal between the diaphragm and the valve seat.

Another specific object of the present invention is to provide an improved construction of this character in which assembly of parts is facilitated and at lower cost and for easy maintenance purposes.

Another specific object of the present invention is to provide a vacuum pallet assembly for use in these constructions wherein the pallet has an enlarged annular grooved portion within which joined outer edge portions of a composite diaphragm are permitted to move as a unit, the diaphragm functioning under changing pressures so as to slide in such annular groove portion and "ballooning" for purposes of assuring a good seal between the diaphragm and its valve seat.

Another specific object of the present invention is to provide an arrangement of this character in which a sealing diaphragm displaces normally in accordance with natural stresses in the diaphragm and such as to minimize or eliminate buckling in the seating area.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is generally a transverse cross-sectional view of a breather valve construction embodying the features of the present invention.

FIGURES 2 and 3 show in enlarged form details of the pressure operated valve and in different operating positions.

FIGURE 4 is a view taken generally as indicated by the line 4—4 in FIGURE 1.

FIGURES 5 and 6 show in enlarged form details of the vacuum valve assembly and in different operating conditions.

The breather valve construction shown in FIGURE 1 includes a bottom or lower housing member 10 and a top or upper housing member 11, the lower housing 10 being in the form of a circular conduit having a lower annular flange portion 10A, apertured at 10B for convenient fastening to the top of a gas or fluid storage structure such as a tank. Such lower housing 10 is also integrally formed with an annular valve seat 10C and an outer ring portion 10D, such ring portion 10D being joined to the valve portion 10C by spaced rib portions 10E. The spacing between rib portions 10E is also indicated in FIGURE 1 and defines a series of openings one of which is illustrated at 10F.

The upper housing portion 11 is formed with an outer lower ring portion 11A and an upper and inwardly disposed flanged portion formed as an annular valve seat 11B.

The upper and lower housing portions 10, 11 are coupled together by an annular clamping band or strap 12 with the outer peripheral edge portion of a diaphragm 13 clamped therebetween. To assure a solid rigid coupling and the clamping of the diaphragm 13 it will be seen in FIGURE 1 that each of the ring portions 10D and 11A have tapered portions contacting corresponding tapered portions of the clamping band 12 so that when the ends of the band 12 are drawn together, as illustrated in FIGURE 4, by a bolt 14 passing through apertured ear portions 12A and 12B on the ends of the band 12, these tapered ring portions 11A and 10D are cammed toward each other to clamp the peripheral portion of diaphragm 13. This clamping action in FIGURE 4 may be increased by holding the bolt 14 and turning the nut 15 threaded on bolt 14.

A stem guide 17 incorporating an elongated bearing sleeve 17A is secured within the lower housing 10 by a series of bolts 18 extending through a ring portion 17B of the stem guide 17, such bolts 18 being threaded in the lower housing 10. A series of radially extending rods 17C extend from the sleeve 17A to the ring portion 17B in a generally spoked construction in which such bearing sleeve 17A is centrally disposed within the lower housing 10 for guiding movement of a stem or rod 20 secured to an upper pallet assembly 22.

The previously mentioned diaphragm 13 is of special construction as shown in FIGURES 1, 5 and 6 so as to incorporate two generally ring-shaped portions 13A and 13B, these ring-shaped portions 13A and 13B each having the same internal diameter and being joined together as indicated at 13C at their peripheral edges and with the external diameter of the ring portion 13B being only somewhat larger than the diameter of the annular valve seat 10C, the joined portions of diaphragm rings 13A and 13B being slidably mounted within a somewhat enlarged annular grooved portion 24A of a vacuum pallet member 24. As seen in FIGURES 1, 5 and 6, the grooved portion 24A is sufficiently deep so as not to interfere with the movement of the joined end portions 13C of diaphragms 13A and 13B.

The stem 20 is threaded at its upper end into the pallet member 26, with a diaphragm member 27, spacer 28, disc 29 and a washer 31 disposed in that order between the threaded pallet member 26 and a shouldered portion of the stem 20. Using this construction the central portion of the diaphragm 27 is firmly clamped. The diaphragm 27 actually includes two diaphragm elements 27A, 27B each having the same outer diameter and each being joined together for movement as a unit at their adjacent joined peripheral portions, the diaphragm 27B having a smaller inner diameter so as to extend over the annular valve seat 11B for engagement with an outer peripheral portion of the rigid disc 29. It will be observed that the joined peripheral portions of the diaphragms 27A and 27B extend within an oversized annular grooved portion 26A of pallet member 26, the grooved portion being sufficiently enlarged so that the joined diaphragm portions 27A and 27B are free to move within the grooved portion 26A.

A plurality of circumferentially spaced rods or posts 30 are threaded into the upper housing 11 and around such posts 30 there is disposed a screen 32.

A generally bell-shaped hood 34 is hingedly secured to the lower housing member 10 using for that purpose a hinge bracket 36 secured to the lower housing member 10 such hinge bracket 36 having an enlarged hole within which bent ends of a rod or bar 38 extend, the outer end of such rod or bar 38 being secured to the hood 34. To secure the hood 34, a latch pin 40 has its inner end threaded in a socket 42, the socket 42 being affixed such as, for example, by welding to a plate 43 which in turn is secured to the bottom housing structure 10 by bolts 45. This latch pin 40 extends through an apertured portion 34A of hood 34 and is retained thereon by the spaced retaining rings 40A and 40B on the latch pin 40. Thus to gain access to the valve structure under the hood 34, the latch pin 40 is removed from its normally threaded engagement in the socket 42 and the hood 34 is pivoted in a counterclockwise direction in FIGURE 1 on the hinge bracket 36. Access is then had to all the parts for the purposes of convenient maintenance.

In further explanation of the arrangement shown in FIGURES 1, 5 and 6, it will be observed that there is a clearance space in the pallet member 24 within which the joined outer edge portions of diaphragms 13A and 13B are permitted to move as a unit. The pressure forces act in the space between diaphragms 13A and 13B on the small portion A (FIGURE 5) where differential forces (atmospheric on one side and internal tank pressure on the other side) can produce a displacement of the diaphragm structure causing a "ballooning" of this portion A of the diaphragm assembly so as to separate in increasing amounts the diaphragm portions 13A and 13B with increasing differential pressure. The forces developed produce, by an inherent lever multiplying action, a much greater radial pressure than can the direct pressure. It is further noted that the diaphragm portion 13A is effectively restrained from any motion other than radial, i.e., the atmospheric pressure holds it against the bottom surface of the pallet member 24. This bottom surface is flat; no direct deformation can take place as a direct result of the pressure forces. Diaphragm 13B, however, has an annular portion A between the valve seat 10C and the outer diameter of the pallet circular portion 24C (FIGURE 5) which defines the pallet retaining groove 24A, and thus a slight movement of this section A (down movement in FIGURES 1 and 5) by leverage amplification can produce relatively high radial forces in diaphragm portion 13B causing the inner periphery to move inwardly. Since diaphragm 13A is secured at its inner periphery to diaphragm 13B, the radial movement of diaphragm 13B acts to produce a radial movement of the periphery of diaphragm 13A. The back-up diaphragm 13A may exhibit some wrinkling or buckling as a result of these compression forces without producing, however, any detrimental results. On the other hand, the sealing diaphragm 13B is allowed to displace normally in accordance with the natural stresses in the diaphragm so as to minimize or eliminate buckling in the seating area.

Thus, as the pressure in the tank drops (the differential pressure increases) the diaphragm portion A is increasingly flexed or "ballooned" so as to produce a good seal at the valve seat 10C with such increasing differential pressures. However, when such differential pressure exceeds a predetermined amount, the pallet 24 pops open and this condition is illustrated generally in FIGURE 6 wherein the valve is illustrated as being open for allowing communication of the interior of the tank to atmosphere.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. A valve structure comprising, a housing structure, a valve member movable with respect to a valve seat on said housing structure and having a portion overlying and extending outwardly in the plane of said valve seat, said valve member having an annular, single open-ended grooved portion, a flexible diaphragm including a first generally planar portion and a second generally planar portion partially overlying said first planar portion and joined thereto at adjacent circular peripheral regions of the same, said circular peripheral regions being disposed within and being slidably mounted in said annular grooved portion for radial movement of said diaphragm generally parallel to said plane of said valve seat, said first diaphragm portion bridging said housing structure and said valve seat and having one of its sides subjected to the pressure externally of said valve seat and having the other one of its sides subjected to the pressure internally of said valve seat, said second diaphragm portion contacting said valve seat and having a first region of the same positioned internally of said valve seat subjected on one side to the pressure internally of the valve seat and on the other side to pressure internally of said valve seat, said second diaphragm portion having a second region of the same extending outside of said valve seat, said first and second diaphragm portions defining an expansible pocket which extends from said joined circular peripheral regions to a point outside of said valve seat with said pocket being expanded in accordance with the difference in internal and external pressures, said joined circular regions being free to move in said grooved portion during expansion of said pocket.

2. A valve structure as set forth in claim 1 said housing structure incorporating a first and a second housing member, said first diaphragm portion being clamped between said first and second housings.

3. A valve structure as set forth in claim 2 in which one of said housing members has said valve seat integrally formed thereon.

4. A valve structure as set forth in claim 3 in which said first and second housing members are each formed with a flanged portion having a tapered surface, and an annular clamping band engaging the tapered surface of each flanged portion and pressing said flanged portions together to clamp said first diaphragm portion therebetween.

References Cited

UNITED STATES PATENTS 3,307,575   3/1967   Dickinson et al. _____ 137—491

M. CARY NELSON, *Primary Examiner.*

R. J. MILLER, *Assistant Examiner.*